United States Patent [19]

Kamm et al.

[11] 4,136,015

[45] Jan. 23, 1979

[54] PROCESS FOR THE THERMAL CRACKING OF HYDROCARBONS

[75] Inventors: Gerard R. Kamm, South Charleston; David Milks, Charleston; James D. Kearns, Charleston; Herbert I. Britt, Charleston; Cyrus R. Khavarian, South Charleston, all of W. Va.

[73] Assignee: Union Carbide Corporation, New York, N.Y.

[21] Appl. No.: 804,227

[22] Filed: Jun. 7, 1977

[51] Int. Cl.$^2$ .............................................. C10G 9/38
[52] U.S. Cl. ................................... 208/129; 208/130; 260/683 R
[58] Field of Search ................... 208/48 Q, 128, 129, 208/130; 260/683 R

[56] References Cited

U.S. PATENT DOCUMENTS 3,408,417  10/1968  Sogawa et al. .................. 260/683 R

*Primary Examiner*—Herbert Levine
*Attorney, Agent, or Firm*—Gerald R. O'Brien, Jr.

[57] ABSTRACT

In a process for the thermal cracking of hydrocarbons by the introduction of liquid petroleum feedstock in atomized form into a stream of hot combustion products formed by the combustion of fuel and oxidant in successive burner and mixing zone, constricting throat zone, a velocity acceleration diffuser zone and secondary cracking and reaction zone along the path of hot combustion product stream flow, an improvement is disclosed which comprises: effecting initial mixing, vaporization and cracking of said atomized liquid petroleum feedstock in said stream of hot combustion products in said burner and mixing zone maintained at subsonic velocity flow; effecting substantially complete mixing and vaporization in said constricting throat zone wherein said stream is maintained, at exit, at sonic velocity flow; passing said stream through a velocity acceleration diffuser zone maintained at supersonic velocity flow; passing said stream through a shock region produced by cross-sectional expansion of a diffuser zone; and effecting a final thermal cracking conversion in said stream in a subsonic velocity additional cracking reaction zone before quenching of said stream.

5 Claims, 4 Drawing Figures

PROCESS FOR THE THERMAL CRACKING OF HYDROCARBONS

The present invention relates to an improved process for the thermal cracking of hydrocarbons for the production of desired olefins.

In the "Advanced Cracking Reaction" (ACR) process, a stream of hot gaseous combustion products is developed in a first stage combustion zone. The hot gaseous combustion products may be developed by the burning of a wide variety of fluid fuels (e.g. gaseous, liquid and fluidized solids) in an oxidant and in the presence of superheated steam. The hydrocarbon feedstock to be cracked is then injected and mixed in a second stage zone, into the hot gaseous combustion product stream to effect the cracking reaction. Upon quenching in a third stage zone the combustion and reaction products are then separated from the stream.

Theory

As employed herein, the following symbols, terms and subscripts have the meanings as set forth:

| | Symbols and Terms | | |
|---|---|---|---|
| | | typical units | |
| T | temperature | °F | °C |
| P | pressure | lbf/in² | kg/cm² |
| ρ | density | lbm/ft³ | kg/cm³ |
| A | area | in² | cm² |
| K | specific heat ratio constant pressure specific heat divided by constant volume specific heat | no units | |
| M | mach number, velocity of gas divided by speed of sound | no units | |
| w,W | mass flow rate | lbm/sec | kg/sec |
| R | gas constant (specific for every gas) universal gas constant divided by molecular weight of gas | | |
| D | diameter | in | cm |
| S/F | steam flow to oil flow ratio - oil is called feed (steam to feed ratio) | | |
| V | velocity of gas | ft/sec | cm/sec |
| PSIG | pounds per square inch measured with a gauge (g) | | |
| $P_b$ | back pressure at diffuser exit | | |

| | Subscripts |
|---|---|
| o | stagnation state |
| * | state at which mach number equals 1.0 |
| max | maximum condition |
| b | back pressure |
| x | supersonic side of shock |
| G | H₂O gas condition |
| Y | subsonic side of shock |
| L | oil liquid condition |
| steam | steam, H₂O |
| oil | oil |
| comb | combustor section of ACR |
| inj | injector circle location of ACR (location where oil is injected) |
| throat | throat section of ACR |
| pilot | pilot cracker |
| diffuser | end of diffuser section |

The reactor for the ACR process is constructed in the approximate form of a converging-diverging nozzle. The relatively high gas velocity resulting from the standard ACR operating conditions requires compressible gas flow effects to be considered in the theoretical analysis of the ACR reactor. The simplest theoretical approximation of the reactor is to model it as the well-known case of isentropic compressible gas flow in a converging-diverging nozzle. This particular model has been examined in detail by standard fluid dynamic reference texts.

These reference texts solve the energy, momentum, and continuity conservation equations for the ideal gas case in order to develop simple algebraic relationships and numerical tables in pressure (P), temperature (T), density (ρ), velocity (V) and nozzle cross-section area (A). Due to the algebraic manipulations, the equations and tables are normally presented based on the parameter mach number (M) (defined as the velocity of the gas divided by the speed of sound of the gas) and the parameter specific heat ratio (K).

In addition, in order to increase the utility of the equations and tables, the pressure, temperature and density at a given location or cross section area are non-dimensionalized by dividing them by a reference state condition. One reference state often presented is the state at which the gas is not moving and is called "stagnation" denoted here by subscript o. Another reference state is based on the conditions where M = 1, denoted by *.

Some of the basic algebraic relationships which are developed into numerical tables are:

$$\frac{P}{P_o} = (1 + (\frac{K-1}{2})M^2)^{\frac{K}{1-K}} \quad (1)$$

$$\frac{T}{T_o} = \frac{1}{1 + (\frac{K-1}{2})M^2} \quad (2)$$

$$\frac{\rho}{\rho_o} = (1 + (\frac{K-1}{2})M^2)^{\frac{1}{1-K}} \quad (3)$$

$$\frac{A}{A^*} = \frac{1}{M}\left[(\frac{2}{K+1})(1 + (\frac{K-1}{2})M^2)\right]^{\frac{K+1}{2(K-1)}} \quad (4)$$

Equations (1), (3) and (4) are based on the isentropic relationships.

$$\frac{P}{P_o} = (\frac{\rho}{\rho_o})^K \quad (5)$$

$$\frac{T}{T_o} = (\frac{P}{P_o})^{\frac{K-1}{K}} \quad (6)$$

and the ideal gas law $$P/\rho = RT \quad (7)$$

A convenient schematic representation of the ACR geometry is shown in the accompanying drawings. If the fluid flow is isentropic, the different $P/P_o$ distributions and the equivalent $T/T_o$ distributions for the converging-diverging nozzle could be expected to exist depending on the exit conditions of the nozzle. In all the indicated isentropic cases for the converging section, the gas velocity increases, the temperature decreases, the pressure decreases and the mach number may increase to a maximum value of 1 as the area decreases. The lowest pressure and temperature in the converging section occurs at the minimum area (throat location) and the theoretical analysis predicts that there exists minimum values of the quantities $P/P_o$ and $T/T_o$ which occur when M = 1 in the throat. With the use of equation (1) at M = 1 and a typical value of K = 1.4, the minimum value of $P/P_o$ at the throat location is determined to be approximately 0.528. The flow conditions corresponding to M = 1 at the throat location are said to be "choked" since for a given gas and given stagnation conditions, ($P_o$, $T_o$), the maximum mass flow (W) per area is obtained where:

$$\left(\frac{W}{A}\right)_{max} = \frac{W}{A^*} = \sqrt{\frac{K}{R}\left(\frac{2}{K+1}\right)^{\frac{K+1}{K-1}}} \frac{P_o}{\sqrt{T_o}} \quad (8)$$

The flow in the diverging section (diffuser) is somewhat more complex. If the value of M at the throat location is less than one, isentropic gas flow equations predict that pressure, $P/P_o$ and temperature, $T/T_o$ will increase (recover) in the diffuser as the area increases. The velocity will decrease and remain subsonic, i.e., less than the speed of sound, M less than one. For the case of M = 1 at the throat location there are two greatly different isentropic $P/P_o$ distributions in the diverging section which are possible. This theoretical result is due to the application of equation (4), i.e., A/A* = function (M), in the diffuser section. For a given value of A/A*, i.e., a given location in the diffuser there are two different values of M which satisfy equation (4). One M value is less than one, subsonic, and the other value of M is greater than one, supersonic. These different M values applied to equation (1) produce the two different isentropic $P/P_o$ distributions in the diffuser which are subsonic and supersonic respectively.

The distribution which occurs in actuality is defined by the value of the isentropically computed nozzle exit pressure, $P_e$, as compared to the numerical value of the back pressure, $P_b$. For purposes of analysis the back pressure $P_b$ may be considered as the physical controlling variable, i.e., $P_b$ may be raised or lowered with appropriate exhaust valving. Lowering the value of $P_b$ produces the choked-subsonic distribution while further lowering the value of $P_b$ produces the choked-supersonic distribution.

There is a range of back pressures which will produce an entire set of pressure distributions, $P/P_o$, and similar temperature distributions, $T/T_o$, which must occur with a normal shock in diffuser. The location of the shock in the diffuser may be moved by varying the back pressure. The shock produces a finite discontinuity in the pressure and the temperature profiles in the diffuser. Across the shock, the flow in the diffuser decelerates from a supersonic case with high velocity, low pressure and low temperature, to a subsonic case with low velocity, high pressure and high temperature. Defining subscripts x and y as conditions before and after the shock, the following relationships are often presented in the texts:

$$\frac{P_y}{P_x} = \frac{1 + K M_x^2}{1 + K M_y^2} \quad (9)$$

$$\frac{T_y}{T_x} = \left(\frac{P_y}{P_x}\right)^2 \left(\frac{M_y}{M_x}\right)^2 \quad (10)$$

$$\frac{M_x \sqrt{1 + \left(\frac{K-1}{2}\right) M_x^2}}{1 + K M_x^2} = \quad (11)$$

-continued $$\frac{M_y \sqrt{1 + \left(\frac{K-1}{2}\right) M_y^2}}{1 + K M_y^2}$$

Note that the conditions of the x location of the discontinuity may be determined by solving equations (1) to (4) for the isentropic supersonic case, i.e., M greater than one. The y conditions may then be found with the use of equations (9)–(11).

In the ACR process the choked-supersonic case may be considered as a pre-quench in temperature since in this case the temperature continues to decrease in the diffuser due to the ACR geometry and associated fluid dynamic flow. Also, the temperature and pressure for the supersonic-shock case in the diffuser at the y location are less than the equivalent temperature at the same location which are produced by pure subsonic flow. These effects are beneficial in the ACR process gas cracking patterns.

The gas flow in the ACR process is much more complex than that which has been presented here. For example, the energy of the cracking medium (steam) is used to vaporize and crack the oil which is added and hence both the stagnation temperature and pressure of the gas flow changes through the ACR process. Also, the fluid flow in the ACR process is composed of gas and liquid droplets, i.e., two phase flow. These effects cause difficulties in analytically determining the choked condition which is necessary for supersonic and shocked flow analysis.

Conclusions

The development of the process of the invention was initially based on the concept that the flow in the reactor was subsonic. Design criteria was established to satisfy this requirement. Supersonic conditions were judged to be undesirable from the standpoint of: (1) maintaining the mechanical integrity of the refractory ceramic liner in the reactor; (2) conserving energy; (3) avoiding operation in a very complicated flow system. While publications in the combustion area claim that a shock wave produced very finely atomized fuel and intimate mixing of the fuel and air, it has been found that fine particles (of the order of 20 microns) and near complete vaporization were achieved in the reactor throat section. Accordingly, it was initially believed that the provision of a supersonic flow and a shock wave presented an unnecessary complication of no benefit to the operation of the process.

It has since been found that: (1) the assumptions and design criteria were incorrect; and (2) operation in the supersonic shock flow regime provides a significant advantage in producing a product yield pattern that contains high selectivity to ethylene with a minimum of fuel by-products.

The Invention

In accordance with the present invention, a process is disclosed for the thermal cracking of hydrocarbons by the introduction of liquid crude oil distillate feedstock in atomized form into a stream of hot combustion products formed by the combustion of fuel and oxidant in successive burner and mixing zone, constricting throat zone, a velocity acceleration diffuser zone and secondary cracking and reaction zone along the path of hot combustion product stream flow, comprising the steps of: effecting initial mixing, vaporization and cracking of said atomized liquid petroleum feedstock in said stream of hot combustion products in said burner and mixing zone maintained at subsonic velocity flow; effecting substantially complete mixing and vaporization in said constricting throat zone wherein said stream is maintained, at exit, at sonic velocity flow; passing said stream through a velocity acceleration diffuser zone maintained at supersonic velocity flow; passing said stream through a shock region produced by cross-sectional expansion of a diffuser zone; and effecting a final thermal cracking conversion in said stream in a subsonic velocity additional cracking reaction zone before quenching of said stream.

The method of the invention will now be more fully described with specific reference to the following data and the appended drawings, in which:

FIG. 2b is a graph of pressure as a function of reactor length related to the length of the apparatus of FIG. 2a.

Figure 1:
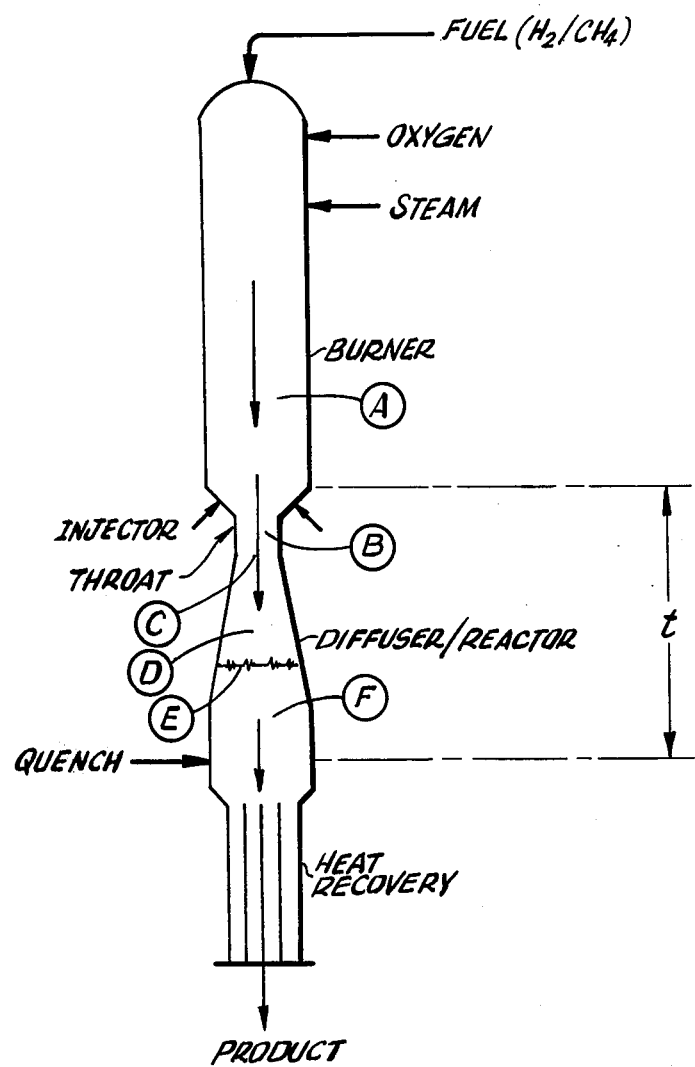
FIG. 1 is a schematic sectional view of combustion burner, reactor, quencher and heat exchanger apparatus for practicing the process for the thermal cracking of hydrocarbons according to the invention.
Figure 2A:
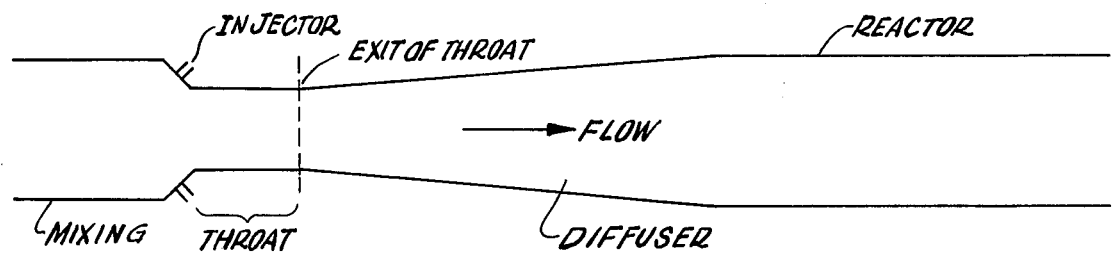
FIG. 2a is a schematic view of a portion of the apparatus of FIG. 1.
Figure 2B:
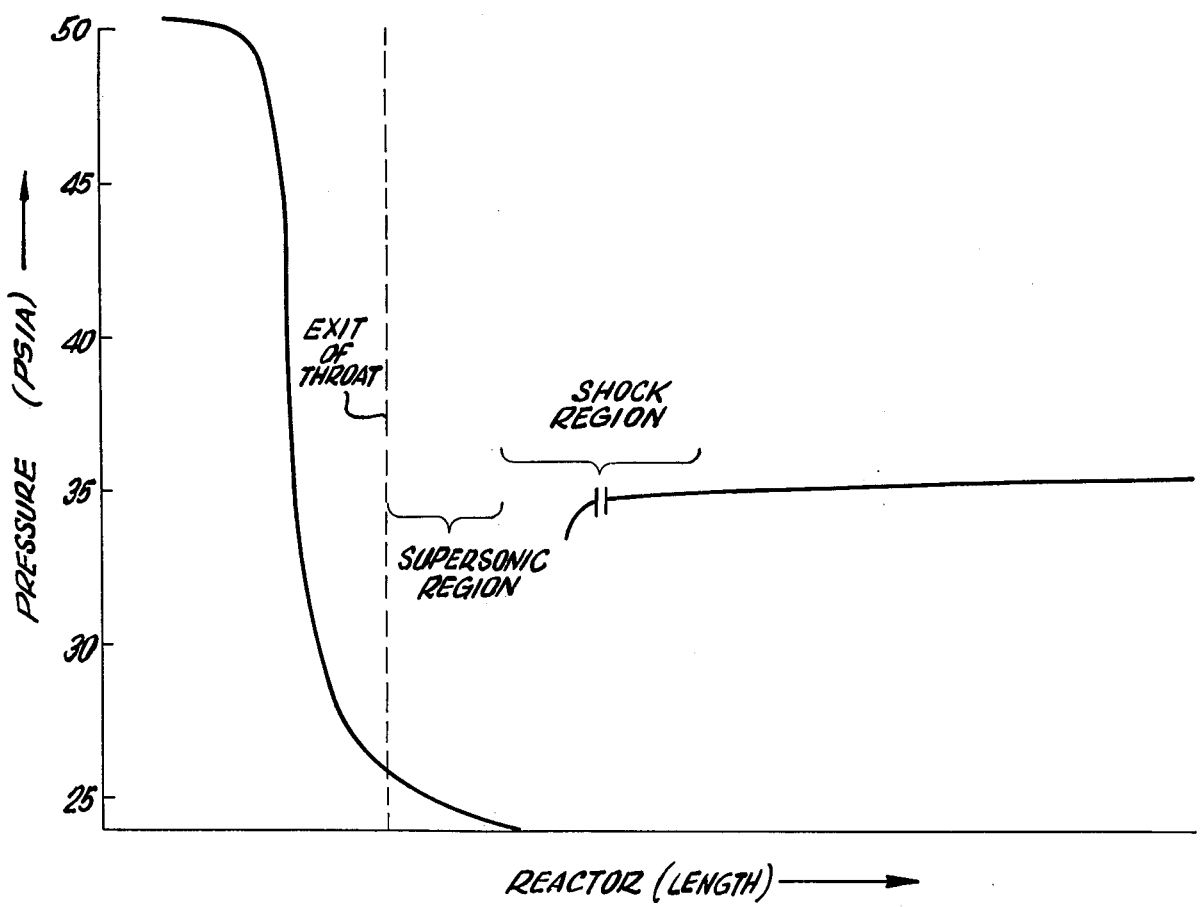

Referring specifically to FIGS. 1, 2a and 2b of the drawings, streams of fuel, oxidant and superheated steam are fed to the burner end of the apparatus. There, in burner chamber (A), combustion is initiated and maintained in the presence of superheated steam at temperatures of the order of 2200° C. Shortly before discharge from chamber (A), streams of hydrocarbon feedstock to be cracked are injected into the hot gaseous combustion product stream and the mixing therewith is initiated. The injected hot gaseous combustion product stream is then discharged into mixing throat zone (B) where further mixing and vaporization of the injected liquid hydrocarbon feedstock is effected.

It has been found that substantially complete mixing and vaporization may be effected by the time the hot gaseous combustion product stream is discharged from the constricted throat zone of the ACR process of the invention.

Preferred liquid injection nozzles for improved mixing of the injected hydrocarbon streams into the hot gaseous combustion product stream are described hereinbelow with respect to FIG. 3 and set forth in greater detail in a copending U.S. patent application Ser. No. 804,224 filed of even data herewith by James D. Kearns and entitled "Penetration Enhanced Fluid Mixing Method for Thermal Hydrocarbon Cracking".

The injected liquid hydrocarbon streams are at a temperature above 200° C., preferably of the order of about 350° C., maintained by preheating.

The velocity of the hot gaseous combustion product stream is in the subsonic velocity range upon exit from chamber (A) and passage through mixing throat zone (B). As the stream passes point (C) at the exit of the mixing throat zone (B), most vaporization and cracking has been effected.

As the hot gaseous combustion product stream passes through flaring diffuser/reactor section (D), its velocity increases to a supersonic velocity (Mach 1.0 to 2.0) which acts to produce a preliminary quenching effect and lowers the temperature of moderate chemical reaction. As the stream reaches region (E), a shock discontinuity is encountered which is accompanied by physical shearing and a discontinuous temperature increase. It is believed that the temperature increase due to the passage through the shock front discontinuity results in further chemical breakdown of existing long chain hydrocarbons to short chain hydrocarbons.

As the stream exits from the flaring diffuser/reactor section, it enters another zone (F) of constant cross-section and consequent subsonic velocity flow which sustains the higher temperature and pressure generated by the shock and which is employed to produce final cracking of the stream.

At the exit end of the zone (F), the reaction product stream is quenched and subsequently passed through a heat exchange zone to extract energy therefrom. The quenched reaction product stream is then successively treated in steps to effect the separation of various specific reaction products.

It has been found that the passage of the hot gaseous combustion product stream from the point of discharge from the exit of chamber (A) to the point of quenching will require no more than about 5 to 50 milliseconds, preferably of the order of about 15-18 milliseconds.

In the above-described passage of the stream through successive zones, it has been noted that the region of subsonic flow of the diffuser and secondary cracking reaction zones constitutes at least 70% of the volume of these combined zones.

The pressure profile along the length of zones from the combustion and mixing zone, to the throat mixing zone, to the diffuser zone, to the final reactor zone, as shown in FIG. 2a of the drawings has been confirmed, as set forth in FIG. 2b of the drawings by the provision of pressure taps at points along the series length of these zones.

Figure 3:
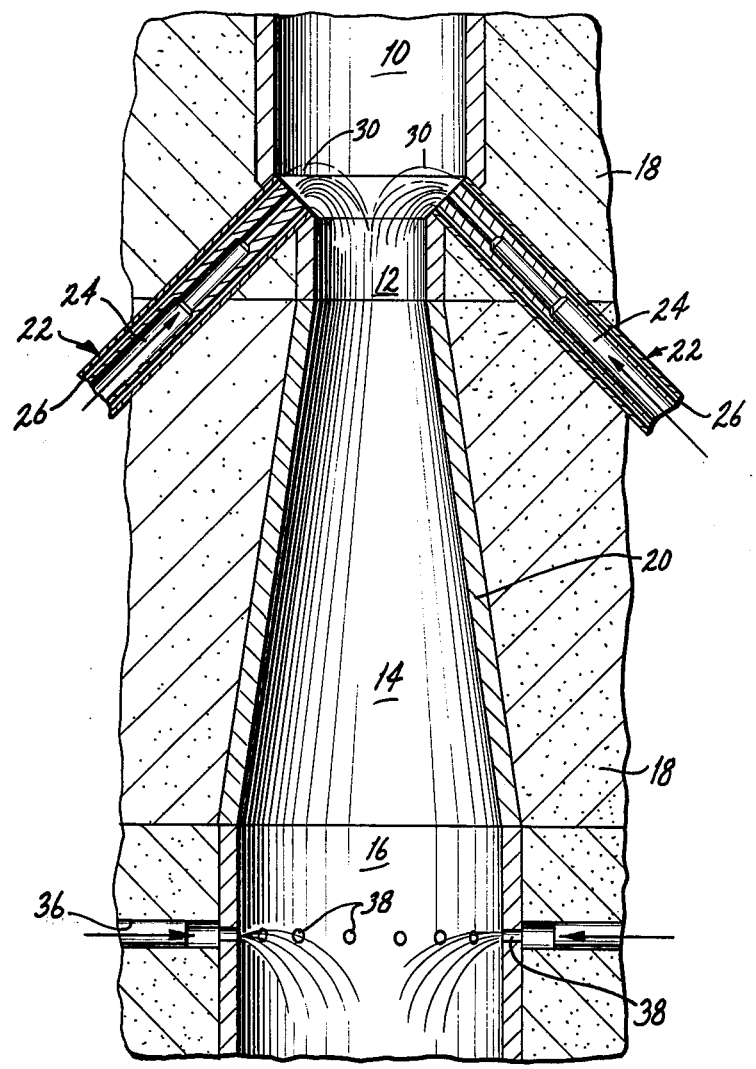
FIG. 3 is a sectional schematic view of apparatus similar to that of FIG. 1, showing in greater detail the elements of construction.

Referring specifically to FIG. 3 of the drawings, the apparatus shown comprises a combustion zone 10 which communicates through a throat section zone 12 with an outwardly flaring reaction zone 14. A quenching zone 16 is positioned at the downstream end of reaction zone 14. The series of treatment zones are contained in apparatus which is constructed of refractory material 18 having inner refractory zone wall linings 20.

Positioned in the tapering base portion of combustion zone 10 are a plurality of liquid phase injection nozzles 22. The nozzles are positioned around the periphery of the combustion zone 10 which is preferably circular in cross-section, as are the other zones of the apparatus.

The liquid phase injection nozzle 22 has a stepped, circular central passage 24 for the flow of liquid hydrocarbon feedstock to be cracked in the ACR process. An annular passage 26 surrounds the central passage 24 and provides for the flow of the annular shroud stream of gas, such as steam, which is discharged from the nozzle around the feedstock stream.

The inlet streams of feedstock and gas are preheated (not shown) to the desired temperature before feeding to the liquid injection nozzles 22.

Upon ejection of the streams 30 from nozzle 22, the shrouded streams of feedstock are injected into the hot gaseous combustion product stream (burner gas) passing from combustion zone 10 to the mixing throat zone 12 where initial mixing is effected. The unitary stream of shrouded liquid feedstock ejected from nozzle 22 follows an outwardly-flaring, curved area trajectory.

As shown in FIG. 3, the quenching fluid is introduced into the quenching zone 16 through inlet conduits 36 which discharge through ports 38.

Examples of the practice of the method of the present invention on a pilot scale are set forth in the following series of TABLES I through IV. These tables set forth data for a comparison of the supersonic mode of operation of the invention with a subsonic mode, using the same apparatus for each mode of operation of the comparison.

TABLE I

RUNS Nos. 1 and 2
(REACTOR GEOMETRY)

Diameter (mm)
- Combustion = $D_c$ = 16.0
- Injection = $D_i$ = 12.9
- Throat = $D_t$ = 9.9
- Diffuser = $D_d$ = 64.0

Length (mm)
- Comb Throat = $L_c$ = 3.0
- Injec - Throat = $L_j$ = 1.5
- Throat = $L_t$ = 8.0
- Diffuser = $L_d$ = 337.0
- Reactor = $L_r$ = 445.0

Injector (Nozzle) Specifications
- Number of Nozzles = 4
- Diameter of Nozzles = 0.33 mm

TABLE II

RAW MATERIALS' OPERATING CONDITIONS

Run No. 1 Supersonic Mode

| | Feedrate, lb/hr | Supply Temperature, °C | Supply Pressure, psig |
|---|---|---|---|
| Hydrogen | 10.01 | 28 | 250 |
| Oxygen | 66.19 | 29 | 150 |
| Steam to burner | 92.40 | 184 | 150 |
| Crude Oil Distillate | 141.90 | 340 | 1280 |

Run No. 2 Subsonic Mode

| | Feedrate, lb/hr | Supply Temperature, °C | Supply Pressure, psig |
|---|---|---|---|
| Hydrogen | 9.82 | 31 | 250 |
| Oxygen | 66.64 | 24 | 150 |
| Steam to burner | 99.22 | 32 | 150 |
| Crude Oil Distillate | 148.40 | 334 | 1166 |

TABLE III

OPERATING CONDITIONS AND YIELDS

| | Supersonic Mode | Subsonic Mode |
|---|---|---|
| Run No. | No. 1 | No. 2 |
| Feedstock | ARABIAN LIGHT | MIDDLE DISTILLATE |
| OPERATING CONDITIONS | | |
| Reactor Pressure, psig | 51.00 | 50.00 |
| Combustion Pressure, psig | 91.50 | 67.50 |
| Pressure Ratio, psia/psia | 0.62 | 0.79 |
| Reactor Outlet Temperature, °C | 820.00 | 755.00 |
| Reactor Inlet Temperature, °C | 2195.00 | 2176.60 |
| Feed Temperature, °C | 340.00 | 334.00 |
| Steam/Feed Dilution, lb/lb | 1.19 | 1.19 |
| Excess Fuel (Hydrogen), % | 20.10 | 16.90 |
| Severity (Ethylene/Acetylene), lb/lb | 13.62 | 13.71 |
| Residence Time, msec | 22.13 | 21.71 |
| GAS YIELDS, LB/100 LB FEED | | |
| Hydrogen | 0.44 | 1.27 |
| Methane | 8.29 | 7.04 |
| Acetylene | 1.98 | 1.83 |
| Ethylene | 27.00 | 25.15 |
| Ethane | 2.62 | 2.58 |
| Met-Acetylene + Propadiene | 0.78 | 0.67 |
| Propylene | 10.65 | 11.37 |
| Propane | 0.48 | 0.52 |
| Vinyl Acetylene | 0.16 | 0.16 |
| Butadiene | 4.30 | 4.24 |
| Butene | 2.45 | 4.13 |
| Burnt Carbon* | 0.82 | 1.56 |
| Hydrogen Sulfide | 0.21 | 0.21 |
| Total Cracked Gas, $H_2$—$C_4$** | 60.18 | 60.73 |
| | Supersonic Mode | Subsonic Mode |
| Run No. | No. 1 | No. 2 |
| LIQUID YIELDS, LB/100 LB FEED | | |
| Isopentenes | 0.14 | 0.46 |
| Piperylenes | 0.94 | 1.22 |
| Cyclopentadiene | 1.67 | 1.21 |
| Benzene | 7.16 | 1.30 |
| Toluene | 3.83 | 0.46 |
| Isopentanes | 0.16 | 0.04 |
| Isohexanes | 0.89 | 0.24 |
| Hexadienes | 0.37 | 0.10 |
| Ethylbenzene | 0.41 | 0.03 |
| Meta + para xylene | 0.67 | 0.07 |
| Orthoxylene | 0.29 | 0.03 |
| Styrene | 0.92 | 0.10 |
| Dicyclopentadiene | 0.14 | 0.00 |
| Isoheptanes | 0.28 | 0.09 |
| Heptenes | 0.04 | 0.01 |
| Phenyl Acetylene | 0.18 | 0.06 |
| N-Octane | 0.16 | 0.05 |
| Cyclic $C_8H_{16}$ | 0.06 | 0.02 |
| 150–220° C Cut | 8.98 | 5.81 |
| Naphthalene (220–270° C Cut) | 1.96 | 4.04 |
| Tar (270–490° C Cut) | 6.37 | 14.52 |
| Pitch (490+) | 4.17 | 9.38 |
| Total Liquids | 39.79 | 39.24 |

*Carbon in Carbon Monoxide and Carbon Dioxide
**Inclusive of Burnt Carbon and Hydrogen Sulfide.

TABLE IV

FEEDSTOCK CHARACTERISTICS

| Number | 4 |
|---|---|
| Type | Arabian Light |
| | Middle Distillate |

Physical Properties

TABLE IV-continued

| | |
|---|---|
| Specific Gravity (60° F/60° F) | 0.8408 |
| Gravity, ° API | 36.80 |
| Surface Tension (25° C), dynes/cm | 28.00 |
| Viscosity (25° C), cps | 4.18 |
| BMCI (Aromatically Index) | 25.06 |
| Characterization Factor | 11.91 |
| Elemental Analysis, Wt. % | |
| Carbon | 85.79 |
| Hydrogen | 13.33 |
| Sulfur | 0.88 |
| H/C Atomic Ratio | 1.85 |
| Liquid Chromatography, Wt. % | |
| Saturates | 69.10 |
| Aromatics | 28.20 |
| Polar | 2.70 |
| Hexane Insolubles | 0.00 |
| Hydrogen by NMR, Wt. % | |
| Aliphatic: Methinyl | 0.78 |
| Methylene | 7.82 |
| Methyl | 4.39 |
| Conradson Carbon, D 189, Wt. % | 0.01 |
| ASTM Distillation (Laboratory) | |
| IBP, ° C | 172.50 |
| FBP, ° C | 420.00 |

The following conclusions are drawn from the data set forth above:

The most noticeable benefit of operation in the supersonic mode is the substantial increase in yields of the desired olefins (about 7% increase in ethylene yield).

There is almost 100% reduction in the amount of burnt carbon (carbon monoxide and carbon dioxide) produced by operation in the supersonic mode.

Operation in the supersonic mode increases the aromaticity of the liquid products and consequently improves desirability of the products so produced. There is a 500% increase in benzene-toluene production by operation in the supersonic mode.

What is claimed is:

1. In a process for the thermal cracking of hydrocarbons by the introduction of liquid crude oil distillate feedstock in atomized form into a stream of hot combustion products formed by the combustion of fuel and oxidant in successive burner and mixing zone, constricting throat zone, a velocity acceleration diffuser zone and secondary cracking and reaction zone along the path of hot combustion product stream flow, the improvement which comprises: effecting initial mixing, vaporization and cracking of said atomized liquid petroleum feedstock in said stream of hot combustion products in said burner and mixing zone maintained at subsonic velocity flow; effecting substantially complete mixing and vaporization in said constricting throat zone wherein said stream is maintained, at exit, at sonic velocity flow; passing said stream through a velocity acceleration diffuser zone maintained at supersonic velocity flow; passing said stream through a shock region produced by cross-sectional expansion of a diffuser zone; and effecting a final thermal cracking conversion in said stream in a subsonic velocity additional cracking reaction zone before quenching of said stream.

2. The process in accordance with claim 1, wherein said supersonic velocity has a Mach number from 1.0 to 2.0.

3. The process in accordance with claim 1, wherein the volume of the region of subsonic flow of said combined diffuser and secondary cracking reaction zones constitutes at least 70% of the volume of said combined zones.

4. The process in accordance with claim 1, wherein said combustion of fuel and oxidant is carried out in the presence of superheated steam injected into said burner zone.

5. The process in accordance with claim 1, wherein said steps from said constricting throat zone to said quenching of said stream are carried out in from 5–50 milliseconds.

* * * * *